(12) United States Patent
Lu et al.

(10) Patent No.: US 12,537,374 B2
(45) Date of Patent: Jan. 27, 2026

(54) PHOTOVOLTAIC SYSTEM, RELAY DETECTION METHOD, AND POWER SUPPLY SYSTEM

(71) Applicant: Huawei Digital Power Technologies Co., Ltd., Shenzhen (CN)

(72) Inventors: Li Lu, Shenzhen (CN); Kai Xin, Shanghai (CN); Xinyu Yu, Shanghai (CN); Yunfeng Liu, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 18/598,117

(22) Filed: Mar. 7, 2024

(65) Prior Publication Data
US 2024/0213767 A1 Jun. 27, 2024

Related U.S. Application Data

(63) Continuation of application No. PCT/CN2021/118637, filed on Sep. 16, 2021.

(51) Int. Cl.
*H02H 7/20* (2006.01)
*G01R 19/165* (2006.01)
(Continued)

(52) U.S. Cl.
CPC ........... *H02H 7/20* (2013.01); *G01R 19/1658* (2013.01); *H02J 3/001* (2020.01); *H02J 3/38* (2013.01); *H02S 50/10* (2014.12); *H02J 2300/24* (2020.01)

(58) Field of Classification Search
CPC .. H02H 7/20; H02S 50/10; H02J 3/001; H02J 3/38; H02J 2300/24
See application file for complete search history.

(56) References Cited

U.S. PATENT DOCUMENTS

2007/0159866 A1* 7/2007 Siri .................. H02M 7/53803
363/95
2016/0373026 A1* 12/2016 Li .......................... H02M 7/537

FOREIGN PATENT DOCUMENTS

| CN | 104682432 A | 6/2015 |
| CN | 109617523 A | 4/2019 |
| CN | 111725981 A | 9/2020 |

OTHER PUBLICATIONS

NFPA, "NFPA 70", National Electrical Code, International Electrical Code Series, National Fire Protection Association, ISBN: 978-145591280-3, Jan. 6, 2017, 881 pages.

* cited by examiner

*Primary Examiner* — Stephanie E Bloss
*Assistant Examiner* — Michael A Harrison
(74) *Attorney, Agent, or Firm* — Maier & Maier, PLLC

(57) ABSTRACT

A photovoltaic system, a relay detection method, and a power supply system. When a fault, for example, sticking of the relay is detected, the controller stops sending a PWM driver gating signal to the inverter, and stops driving of a switch transistor in the inverter, and the inverter stops outputting power, and then determines whether a voltage difference between two ends of the relay is greater than a preset value, to determine whether the relay is faulty. The controller stops sending the PWM driver gating signal to the inverter only within a preset phase range of a voltage of the filter capacitor, to ensure that the voltage of the filter capacitor has a large value. Because the voltage of the filter capacitor is large, an alternating current grid-to-ground voltage is pulled up, to avoid detecting the fault as an alternating current grid-to-ground short circuit.

20 Claims, 8 Drawing Sheets

(51) Int. Cl.
*H02J 3/00* (2006.01)
*H02J 3/38* (2006.01)
*H02S 50/10* (2014.01)

PHOTOVOLTAIC SYSTEM, RELAY DETECTION METHOD, AND POWER SUPPLY SYSTEM

CROSS-REFERENCE TO RELATED APPLICATIONS

This application is a continuation of International Application No. PCT/CN2021/118637, filed on Sep. 16, 2021, the disclosure of which is hereby incorporated by reference in its entirety.

TECHNICAL FIELD

The embodiments relate to the field of power system technologies and to a photovoltaic system, a relay detection method, and a power supply system.

BACKGROUND

A photovoltaic system includes a photovoltaic array and an inverter. In addition to a power conversion circuit, the inverter includes a relay. The power conversion circuit is connected to a power grid by using the relay. A controller of the inverter may control an on/off state of the relay to implement functions such as a photovoltaic grid connection, a photovoltaic grid disconnection, and protection of the photovoltaic system. Therefore, whether the relay is in a normal state exerts great impact on the photovoltaic system.

In an actual application, the relay may be abnormal. In some situations, the relay is not turned off successfully after receiving a turn-off instruction, but keeps an on state. For example, the relay is faulty, for example, is stuck, and consequently, cannot be turned off successfully.

Currently, reliability of all solutions for detecting whether the relay is faulty is poor, and detection may be missed. For example, the relay is faulty and stuck, but that the relay is stuck is not detected. Consequently, there is a large potential risk in the photovoltaic system.

SUMMARY

The embodiments provide a photovoltaic system, a relay detection method, and a power supply system, to accurately detect whether the relay is faulty, so as to send a fault alarm in a timely manner when the relay is faulty.

The embodiments provide a photovoltaic system, including an inverter, a filter capacitor, a relay, and a controller. An input of the inverter is configured to be connected to a photovoltaic array, an output of the inverter is connected to a first end of the relay, and a second end of the relay is configured to be connected to an alternating current grid; the output of the inverter is connected to the filter capacitor; and the controller is configured to: send a turn-off instruction to the relay when a voltage of the filter capacitor and an alternating current grid voltage have a same frequency and a same phase, stop driving of an action of a switch transistor in the inverter when the phase of the voltage of the filter capacitor falls within a preset phase range, and send fault alarm information of the relay when detecting that a valid value of a difference between the voltage of the filter capacitor and the alternating current grid voltage is less than a preset value, where the voltage of the filter capacitor is greater than or equal to a preset threshold when the phase of the voltage of the filter capacitor falls within the preset phase range.

It can be understood that, to avoid a case in which a fault of the inverter is detected as an alternating current grid-to-ground short circuit because an alternating current grid-to-ground voltage is too low when a pulse width modulation (PWM) driver gating signal stops being sent to the inverter, the controller in the photovoltaic system stops sending a PWM driver gating signal to the inverter only within the preset phase range of the voltage of the filter capacitor, to ensure that the voltage of the filter capacitor has a large value. The voltage of the filter capacitor is output to an alternating current grid side. Because the voltage of the filter capacitor is large, the alternating current grid-to-ground voltage is pulled up, to avoid detecting the fault as an alternating current grid-to-ground short circuit, so that it can be detected that the relay is faulty.

In a possible implementation, the controller is configured to obtain the phase of the voltage of the filter capacitor based on the phase of the alternating current grid voltage. It can be understood that, in the solution, the voltage of the filter capacitor can be directly obtained based on the alternating current grid voltage, to avoid newly adding a voltage detection circuit on a filter capacitor side, so as to reduce costs of the photovoltaic system provided in the embodiments.

In a possible implementation, the controller is configured to perform phase locking on a phase voltage of any phase of the alternating current grid, to obtain the phase of the alternating current grid voltage. In this embodiment, after phase locking is performed on the phase voltage of the any phase of the alternating current grid, when it is detected that a relay corresponding to the phase is stuck, a relay sticking alarm is sent, so that a fault is processed in a timely manner.

In a possible implementation, the controller is configured to stop driving of the action of the switch transistor in the inverter when the phase of the voltage of the filter capacitor is at a peak of the voltage of the filter capacitor. The controller stops driving of the action of the switch transistor in the inverter at the peak of the voltage of the filter capacitor, so that the voltage of the filter capacitor can be kept at the peak, that is, the voltage of the filter capacitor is kept to have a maximum value, to pull up the alternating current grid-to-ground voltage, so as to avoid detecting the fault as an alternating current grid-to-ground short circuit, so that it can be really detected that the relay is faulty.

In a possible implementation, the relay includes a first-level relay and a second-level relay. The first-level relay and the second-level relay are connected in series between the output of the inverter and the alternating current grid; and the controller is configured to: send a turn-off instruction to the second-level relay when sending a turn-on instruction to the first-level relay, and send fault alarm information of the second-level relay when the valid value of the difference between the voltage of the filter capacitor and the alternating current grid voltage is less than the preset value. When the relay includes the first-level relay and the second-level relay, the first-level relay and the second-level relay may be separately detected during detection of the relay, to improve detection accuracy.

In a possible implementation, the relay includes a first-level relay and a second-level relay. The first-level relay and the second-level relay are connected in series between the output of the inverter and the alternating current grid; and the controller is configured to: send a turn-on instruction to the second-level relay when sending a turn-off instruction to the first-level relay, and send fault alarm information of the first-level relay when the valid value of the difference between the voltage of the filter capacitor and the alternating current grid voltage is less than the preset value.

In a possible implementation, when any phase in three phases of the alternating current grid is grounded, the controller is configured to: drive an action of a switch transistor of the any phase in the inverter after the valid value of the difference between the voltage of the filter capacitor and the alternating current grid voltage is less than the preset value, and send fault alarm information of a relay of the any phase when determining that the valid value of the difference between the voltage of the filter capacitor and the alternating current grid voltage is still less than the preset value.

A phase V represents any phase in the three phases. When the phase V is grounded, an alternating current grid voltage corresponding to the phase V is 0 because the phase V is grounded. According to the solution provided in this embodiment, before the voltage of the filter capacitor is measured, driving of the action of the switch transistor in the inverter is stopped, and a voltage of a filter capacitor corresponding to the phase V is a stable direct current voltage. In addition, because the voltage of the filter capacitor corresponding to the phase V is obtained through non-direct current blocking sampling, a collected voltage of the filter capacitor is also 0. It can be understood that, the valid value of the difference between the alternating current grid voltage corresponding to the phase V and the voltage of the filter capacitor is zero, that is, less than the preset value 30 V. Therefore, if the solution is used to detect whether the relay is stuck, when the relay is turned off normally, the valid value of the difference between the alternating current grid voltage corresponding to a grounding phase (the phase V) and the voltage of the filter capacitor is also zero, and it is wrongly determined that the relay is stuck. When an action of a switch transistor of the phase V in the inverter is driven, the inverter outputs an alternating current, and the voltage of the filter capacitor of the phase V is an alternating current voltage. Therefore, when a switch of a relay corresponding to the phase V is turned off normally, the voltage that is of the filter capacitor corresponding to the phase V and that is collected by the photovoltaic system is a valid voltage value. Therefore, a voltage difference between two ends of the relay of the phase V is a voltage value of the filter capacitor minus 0. In other words, a difference between an alternating current grid voltage corresponding to the relay of the phase V and the voltage of the filter capacitor is the voltage value of the filter capacitor, and is greater than the preset value, and the relay of the phase V is determined to be in a normal state. According to the solution provided in this embodiment, when the relay of the phase V is turned off normally, the relay of the phase V is determined to be normal. That is, in this solution, wrongly determining that the relay is stuck can be avoided.

In a possible implementation, the controller is further configured to: drive an action of a switch transistor of any phase in three phases in the inverter after the valid value of the difference between the voltage of the filter capacitor and the alternating current grid voltage is less than the preset value, and send fault alarm information of a relay of the any phase when determining that the valid value of the difference between the voltage of the filter capacitor and the alternating current grid voltage is still less than the preset value. For example, the fault is that the relay is stuck. When it is determined that a relay of any phase in the relay is stuck or after it is determined that the relay is stuck, the photovoltaic system provided in this embodiment may not send fault alarm information indicating that the relay is stuck, but drive an action of a switch transistor in an inverter corresponding to sticking in the inverter. The fault alarm information indicating that the relay is stuck is sent only when the valid value of the difference between the voltage of the filter capacitor and the alternating current grid voltage is less than the preset value, to improve accuracy and reliability of detecting a fault of the relay.

According to the photovoltaic system provided in the foregoing embodiment, an advantage of the system is also applicable to a method part, and details are not described herein again. The embodiments further provide a relay detection method. The method is applied to a photovoltaic system. The photovoltaic system includes an inverter, a filter capacitor, and a relay, an input of the inverter is configured to be connected to a photovoltaic array, an output of the inverter is connected to a first end of the relay, a second end of the relay is connected to an alternating current grid, the output of the inverter is connected to the filter capacitor, and the method includes: sending a turn-off instruction to the relay when a voltage of the filter capacitor and an alternating current grid voltage have a same frequency and a same phase; stopping driving of an action of a switch transistor in the inverter within a preset phase range of the voltage of the filter capacitor; and sending fault alarm information of the relay when it is detected that a valid value of a difference between the voltage of the filter capacitor and the alternating current grid voltage is less than a preset value, where the voltage of the filter capacitor is greater than or equal to a preset threshold when the phase of the voltage of the filter capacitor falls within the preset phase range.

In a possible implementation, the relay detection method provided in this embodiment further includes: obtaining the phase of the voltage of the filter capacitor based on the phase of the alternating current grid voltage. The obtaining the phase of the voltage of the filter capacitor based on the phase of the alternating current grid voltage may be: performing phase locking on a phase voltage of any phase of the alternating current grid, to obtain the phase of the alternating current grid voltage.

In a possible implementation, the stopping driving of an action of a switch transistor in the inverter within a preset phase range of the voltage of the filter capacitor includes: stopping driving of the action of the switch transistor in the inverter when the phase of the voltage of the filter capacitor is at a peak of the voltage of the filter capacitor.

In a possible implementation, the relay provided in this embodiment includes a first-level relay and a second-level relay. The first-level relay and the second-level relay are connected in series between the output of the inverter and the alternating current grid; the sending a turn-off instruction to the relay includes: sending a turn-off instruction to the second-level relay when sending a turn-on instruction to the first-level relay; and the sending fault alarm information of the relay when it is detected that a valid value of a difference between the voltage of the filter capacitor and the alternating current grid voltage is less than a preset value includes: sending fault alarm information of the second-level relay when the valid value of the difference between the voltage of the filter capacitor and the alternating current grid voltage is less than the preset value.

In a possible implementation, the relay provided in this embodiment includes a first-level relay and a second-level relay. The first-level relay and the second-level relay are connected in series between the output of the inverter and the alternating current grid; the sending a turn-off instruction to the relay includes: sending a turn-on instruction to the second-level relay when sending a turn-off instruction to the first-level relay; and the sending fault alarm information of the relay when it is detected that a valid value of a difference between the voltage of the filter capacitor and the alternating current grid voltage is less than a preset value includes: sending fault alarm information of the first-level relay when the valid value of the difference between the voltage of the filter capacitor and the alternating current grid voltage is less than the preset value.

In a possible implementation, when any phase in three phases of the alternating current grid is grounded, after the valid value of the difference between the voltage of the filter capacitor and the alternating current grid voltage is less than the preset value, the method further includes: driving an action of a switch transistor of any phase in three phases in the inverter, and sending fault alarm information of a relay of the any phase when it is determined that the valid value of the difference between the voltage of the filter capacitor and the alternating current grid voltage is still less than the preset value.

In a possible implementation, after the valid value of the difference between the voltage of the filter capacitor and the alternating current grid voltage is less than the preset value, the method further includes: driving an action of a switch transistor of any phase in three phases in the inverter, and sending fault alarm information of a relay of the any phase when the valid value of the difference between the voltage of the filter capacitor and the alternating current grid voltage is still less than the preset value.

According to the photovoltaic system and the relay detection method provided in the foregoing embodiments, embodiments can further provide a photovoltaic system, including an inverter, a filter capacitor, a relay, and a controller. An input of the inverter is configured to be connected to a photovoltaic array, an output of the inverter is connected to a first end of the relay, and a second end of the relay is connected to an alternating current grid; the output of the inverter is connected to the filter capacitor; and the controller is configured to: send a turn-off instruction to the relay when a voltage of the filter capacitor and an alternating current grid voltage have a same frequency and a same phase, drive an action of a switch transistor of any phase in three phases in the inverter, and send fault alarm information of a relay of the any phase when a valid value of a difference between the voltage of the filter capacitor and the alternating current grid voltage is less than a preset value.

According to the photovoltaic system and the relay detection method provided in the foregoing embodiments, the embodiments further provide a power supply system, including an inverter, a filter capacitor, a relay, and a controller. An input of the inverter is configured to be connected to a direct current power supply, an output of the inverter is connected to a first end of the relay, and a second end of the relay is connected to an alternating current grid; the output of the inverter is connected to the filter capacitor; and the controller is configured to: send a turn-off instruction to the relay when a voltage of the filter capacitor and an alternating current grid voltage have a same frequency and a same phase, stop driving of an action of a switch transistor in the inverter when the phase of the voltage of the filter capacitor falls within a preset phase range, and send fault alarm information of the relay when detecting that a valid value of a difference between the voltage of the filter capacitor and the alternating current grid voltage is less than a preset value, where the voltage of the filter capacitor is greater than or equal to a preset threshold when the phase of the voltage of the filter capacitor falls within the preset phase range.

The solutions of the embodiments include at least the following advantages:

The photovoltaic system includes the inverter, the filter capacitor, the relay, and the controller. The filter capacitor is connected to the output of the inverter, and the relay is connected between the output of the inverter and the alternating current grid. When a fault, for example, a sticking fault, of the relay is detected, the controller stops sending a PWM driver gating signal to the switch transistor in the inverter, that is, stops driving the switch transistor in the inverter, so that the inverter stops outputting power, and then determines whether the voltage difference between the two ends of the relay is greater than the preset value, to determine whether the relay is stuck. A voltage of a side that is of the relay and that is close to the inverter is the voltage of the filter capacitor, and a voltage of a side that is of the relay and that is close to the alternating current grid is the alternating current grid voltage. However, when the relay is really stuck, it is easily determined that the fault is an alternating current grid-to-ground short circuit. In this case, it is considered by default that the relay is not stuck, and the relay is no longer detected. Consequently, detecting sticking of the relay is missed. To resolve the problem, in the solution provided in the embodiments, the controller stops sending a PWM driver gating signal to the inverter only within the preset phase range of the voltage of the filter capacitor, to ensure that the voltage of the filter capacitor has a large value, and the voltage of the filter capacitor is output to an alternating current grid side. Because the voltage of the filter capacitor is large, the alternating current grid-to-ground voltage is pulled up, to avoid detecting the fault as an alternating current grid-to-ground short circuit, so that it is really detected that the relay is stuck.

DETAILED DESCRIPTION OF EMBODIMENTS

The following terms "first", "second", and the like are merely intended for a purpose of description, and shall not be understood as an indication or implication of relative importance or implicit indication of a quantity of indicated features. Therefore, a feature limited by "first", "second", or the like may explicitly or implicitly include one or more features. In description of the embodiments, unless otherwise stated, "a plurality of" means two or more than two.

In addition, in the embodiments, orientation terms such as "up" and "down" may include, but are not limited to, orientations of schematically placed components in relative accompanying drawings. It should be understood that these orientation terms may be relative concepts. The orientation terms are used for relative description and clarification, and may vary correspondingly based on a change in an orientation in which the component is placed in the accompanying drawings.

In the embodiments, unless otherwise specified and limited, the term "connection" should be understood in a broad sense. For example, the "connection" may be a fixed connection, a detachable connection, an integration, a direct connection, or an indirect connection by using an intermediate medium. In addition, a term "coupling" may be a manner of implementing an electrical connection for signal transmission. The "coupling" may be a direct electrical connection, or may be an indirect electrical connection through an intermediate medium.

Embodiments relate to a photovoltaic system. The photovoltaic system includes an inverter and a relay. An input of the inverter is connected to a direct current power supply, and an output of the inverter is connected to an alternating current grid by using the relay. The relay can be integrated into a cabinet of the inverter. To protect security of actual operation and reliably disconnect the inverter from the alternating current grid, the relay can include two levels connected in series, that is, a first-level relay and a second-level relay.

The following describes, by using an example in which a relay includes a first-level relay and a second-level relay, a basic architecture of a photovoltaic system provided in an embodiment.

Figure 1:
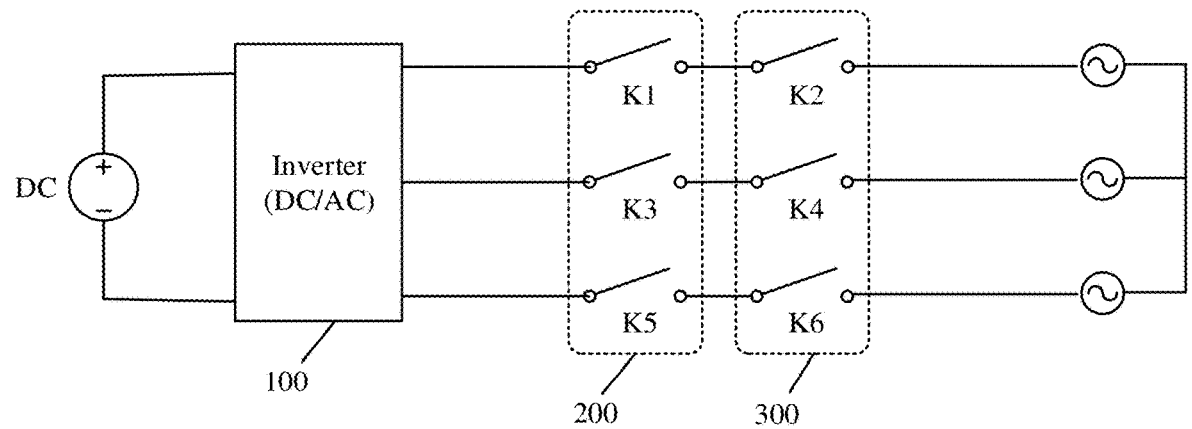
FIG. 1 is a schematic diagram of a photovoltaic system according to an embodiment.

FIG. 1 is a schematic diagram of a photovoltaic system according to an embodiment.

The photovoltaic system provided in this embodiment includes an inverter 100, a first-level relay 200, and a second-level relay 300. A three-phase inverter and a three-phase alternating current grid are used as an example. Three phases included in the first-level relay 200 are K1, K3, and K5, and three phases included in the second-level relay 300 are K2, K4, and K6.

An input of the inverter 100 is configured to be connected to a direct current power supply DC. A specific form of the direct current power supply DC is not limited in this embodiment. An example in which the direct current power supply DC is a photovoltaic array is used for description.

An output of the inverter 100 is connected to a first end of the first-level relay 200, a second end of the first-level relay 200 is connected to a first end of the second-level relay 300, and a second end of the second-level relay 300 is configured to be connected to an alternating current grid.

In a possible implementation, in the photovoltaic system provided in this embodiment, K1, K3, and K5 in the first-level relay 200 may be controlled by a same switch signal, that is, a synchronous action, and K2, K4, and K6 in the second-level relay 300 may also be controlled by a same switch signal, that is, a synchronous action. In another possible implementation, K1, K3, and K5 in the first-level relay 200 may be controlled by different switch signals, and K2, K4, and K6 in the second-level relay 300 may also be controlled by different switch signals. This is not limited in this embodiment.

To simplify solutions provided in embodiments and facilitate understanding of the solutions provided, the following describes, by using an example in which a relay is stuck, whether the relay is faulty and consequently, cannot be turned off effectively when receiving a turn-off instruction, that is, cannot disconnect an inverter from an alternating current grid. An example in which three phases of switches in a one-level relay act simultaneously is used for description.

Figure 2:
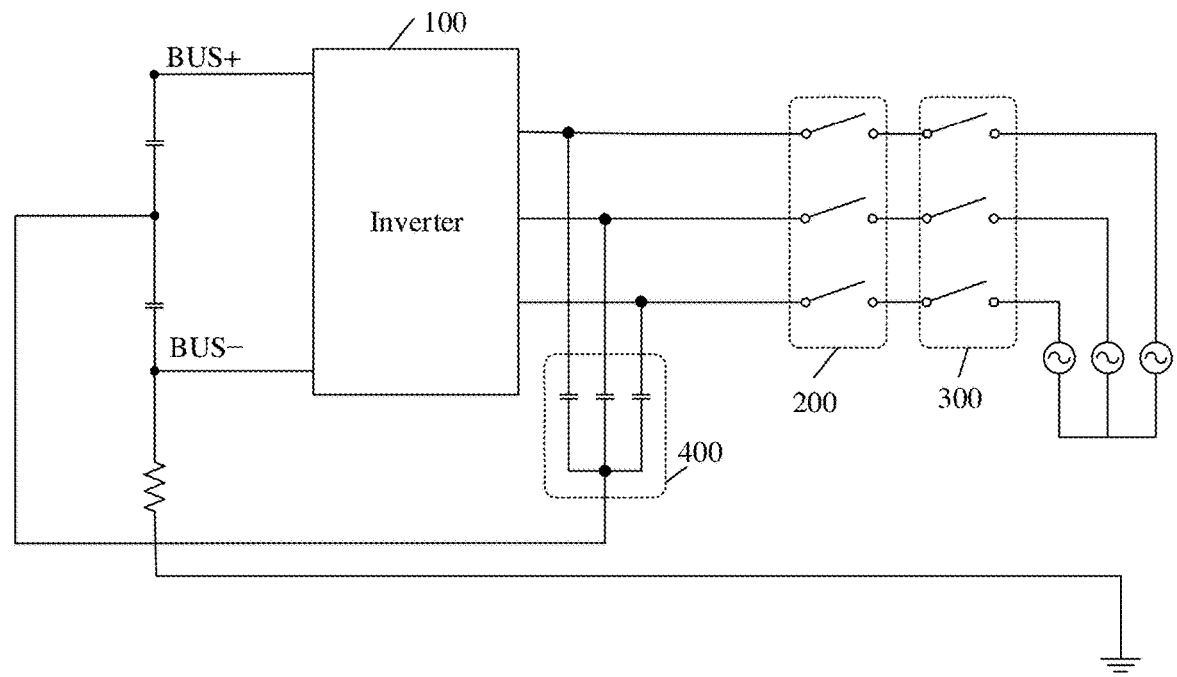
FIG. 2 is a circuit diagram of a photovoltaic system according to an embodiment.

FIG. 2 is a circuit diagram of a photovoltaic system according to an embodiment.

The photovoltaic system provided in this embodiment includes an inverter 100, a first-level relay 200, a second-level relay 300, and a filter capacitor 400.

A positive input and a negative input of the inverter 100 are respectively connected to a direct current positive bus BUS+ and a direct current negative bus BUS− of a direct current power supply.

An output of the inverter 100 is connected to a first end of the first-level relay 200, a second end of the first-level relay 200 is connected to a first end of the second-level relay 300, a second end of the second-level relay 300 is configured to be connected to an alternating current grid, and the filter capacitor 400 is connected between a direct current midpoint of an input of the inverter 100 and the output. In an actual application, the inverter 100, the first-level relay 200, and the second-level relay 300 may be all integrated inside a cabinet of the inverter.

When whether the relay is faulty, for example, is stuck is detected, the one-level relay needs to be controlled to be turned on, a detected one-level relay is controlled to be turned off, and whether a voltage between two ends of the detected one-level relay is greater than a preset value is determined. When the voltage is greater than the preset value, it is determined that the detected relay is not stuck, and when the voltage is not greater than the preset value, it is determined that the detected relay is stuck. To better understand the photovoltaic system provided in this embodiment, two levels of relays connected in series are collectively referred to as a relay in this embodiment below to describe a solution provided in this embodiment.

The photovoltaic system provided in this embodiment may detect whether the relay is faulty, for example, whether the relay is stuck, that is, whether a controller has sent a turn-off instruction to the relay but the relay is not turned off. To better understand the solution provided in this embodiment, an example in which whether the relay is stuck is detected is used to describe the solution provided.

Figure 3:
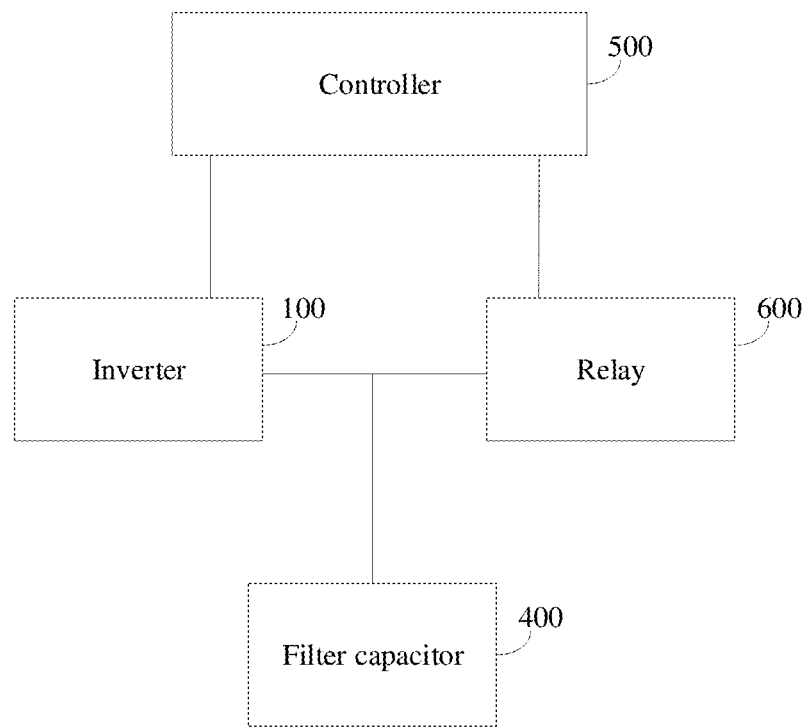
FIG. 3 is a schematic diagram of another photovoltaic system according to an embodiment.

FIG. 3 is a schematic diagram of another photovoltaic system according to an embodiment.

The photovoltaic system provided in this embodiment includes an inverter 100, a filter capacitor 400, a relay 600, and a controller 500.

An input of the inverter 100 is configured to be connected to a photovoltaic array, an output of the inverter 100 is connected to a first end of the relay 600, a second end of the relay 600 is configured to be connected to an alternating current grid, and the output of the inverter 100 is connected to the filter capacitor 400.

In this embodiment, to avoid a case in which a voltage of the filter capacitor is small when a PWM driver gating signal randomly stops being sent to the inverter, and detecting that the relay is stuck is missed because the relay is stuck, but such a fault is determined as an alternating current grid-to-ground short circuit, in the solution provided in this embodiment, a PWM driver gating signal stops being sent when the voltage of the filter capacitor is large, instead of randomly stopping being sent, to pull up the alternating current grid-to-ground voltage. In this way, the fault is not detected as an alternating current grid-to-ground short circuit. When the relay is stuck, that the relay is stuck may be reliably detected.

The controller 500 is configured to: send a turn-off instruction to the relay 600 when a voltage of the filter capacitor 400 and an alternating current grid voltage have a same frequency and a same phase, stop driving of an action of a switch transistor in the inverter 100 when the phase of the voltage of the filter capacitor 400 falls within a preset phase range, and send fault alarm information of the relay 600 when detecting that a valid value of a difference between the voltage of the filter capacitor 400 and the alternating current grid voltage is less than a preset value. The voltage of the filter capacitor 400 is greater than or equal to a preset threshold when the phase of the voltage of the filter capacitor 400 falls within the preset phase range. The preset threshold may be selected based on a requirement, provided that a value close to a peak of the voltage of the filter capacitor is selected. In other words, it is ensured that the voltage of the filter capacitor is large when the PWM driver gating signal stops being sent.

In this embodiment, a specific value of the preset value is not limited, and may be set based on a requirement of an actual product, provided that whether the relay is stuck may be reliably detected. For example, the preset value may be 30 V. When a voltage difference between two ends of the relay is greater than 30 V, it is determined that the relay is normal and is not stuck; or when a voltage difference between two ends of the relay is less than 30 V, it is determined that the relay is stuck and there is an abnormality. Fault alarm information is sent, and the relay needs to be repaired or replaced.

It should be understood that in the foregoing provided solution, after the voltage of the filter capacitor and the alternating current grid voltage are controlled to have a same frequency and a same phase, a turn-off instruction may be sent to a to-be-detected relay, and then a drive signal of the inverter is stopped randomly, that is, the PWM driver gating signal stops being sent, to no longer drive the action of the switch transistor in the inverter.

When the to-be-detected relay is turned off successfully after receiving the turn-off instruction, that is, the relay is in a normal state and is not stuck, the voltage of the filter capacitor is a voltage corresponding to a preset phase. In this case, the valid value of the difference between the voltage of the filter capacitor and the alternating current grid voltage is greater than the preset value. When the to-be-detected relay is not turned off after receiving the turn-off instruction, that is, the relay is in an abnormal state and is stuck, the valid value of the difference between the voltage of the filter capacitor and the alternating current grid voltage is less than the preset value.

According to the solution provided in this embodiment, the controller stops sending a PWM driver gating signal to the inverter only within the preset phase range of the voltage of the filter capacitor, to ensure that the voltage of the filter capacitor has a large value. The voltage of the filter capacitor is output to an alternating current grid side. Because the voltage of the filter capacitor is large, the alternating current grid-to-ground voltage is pulled up, to avoid detecting the fault as an alternating current grid-to-ground short circuit, so that it can be really detected that the relay is stuck.

In this embodiment, the preset phase range is a preset phase range corresponding to a large voltage value of the filter capacitor. For example, the PWM driver gating signal stops being sent when the voltage is close to the peak of the voltage of the filter capacitor. Because the voltage of the filter capacitor is an alternating current voltage, a phase of the alternating current voltage may be determined to correspondingly determine the voltage close to the peak.

In the photovoltaic system provided in this embodiment, in a possible implementation, the preset phase range in this embodiment may include a phase range corresponding to a voltage value that is of the filter capacitor and that is greater than a preset capacitor voltage.

The following describes, with reference to an equivalent circuit diagram of a photovoltaic system, an operating principle of detecting a relay in embodiments.

Figure 4:
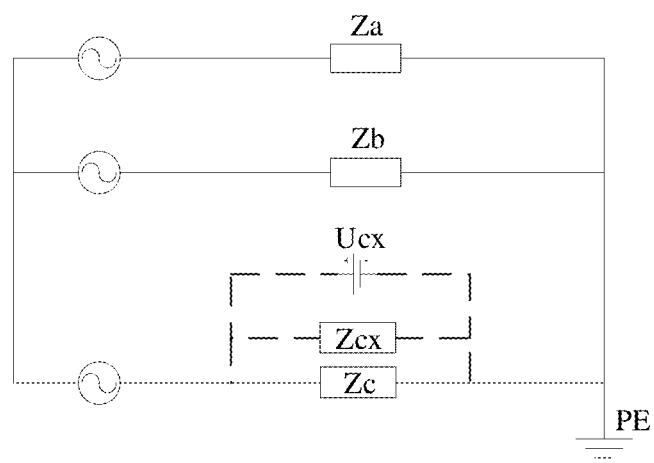
FIG. 4 is an equivalent circuit diagram of a photovoltaic system according to an embodiment.

FIG. 4 is an equivalent circuit diagram of a photovoltaic system according to an embodiment.

Ground PE voltages of all phases of an alternating current grid provided in this embodiment are respectively determined by ground impedance Za, Zb, and Zc of three phases. The following provides descriptions by using a phase C as an example. When the relay is stuck, equivalent impedance Zex on an inverter side is connected in parallel to a phase C-to-PE end of the alternating current grid. As shown in FIG. 4, Zex is connected in parallel to two ends of Zc. Therefore, phase C-to-ground impedance of the alternating current grid becomes smaller. However, to pull up a phase C-to-ground voltage to avoid detecting a fault as a short circuit fault, in this embodiment, a PWM driver gating signal stops being sent when a voltage of a filter capacitor is large. In this case, a voltage Ucx of the filter capacitor is applied to parallel impedance, to pull up the phase C-to-ground voltage, and determine whether the relay is stuck.

In the photovoltaic system provided in this embodiment, driving of an action of a switch transistor in an inverter may be stopped within a preset phase range of the voltage of the filter capacitor, to ensure that the voltage Ucx of the filter capacitor is large when it is detected that the relay is stuck, that is, Ucx is kept to have a large value. Ucx is used to pull up the phase C-to-ground voltage. Therefore, in the photovoltaic system provided in this embodiment, the alternating current grid voltage-to-ground voltage may be greater than a short-circuit voltage threshold, and it is not determined that an alternating current grid-to-ground short circuit fault occurs, to really detect whether the relay is stuck.

If a controller 500 randomly stops driving of the action of the switch transistor in the inverter 100, that is, randomly stops sending the PWM driver gating signal, the PWM driver gating signal may stop being sent when the voltage of the filter capacitor is low. If the relay is stuck, the voltage of the filter capacitor is equal to the phase C. However, the voltage of the filter capacitor is small, the phase C-to-ground voltage is still less than the short-circuit voltage threshold, and an alternating current grid-to-ground short circuit is detected. In this case, it is considered that the relay is normal, and that the relay is stuck is not detected.

The following analyzes, with reference to an equivalent circuit diagram of a photovoltaic system, a reason why detecting that the relay is stuck is missed because the PWM driver gating signal randomly stops being sent.

Figure 5:
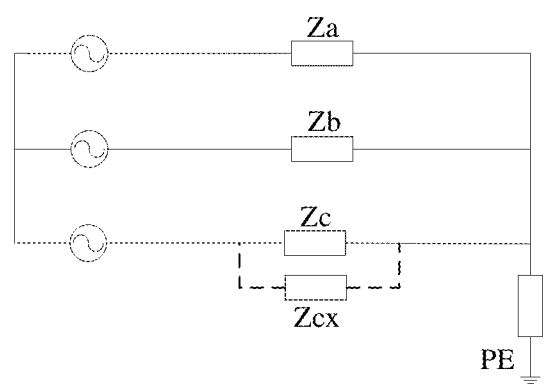
FIG. 5 is an equivalent circuit diagram of another photovoltaic system according to an embodiment.

FIG. 5 is an equivalent circuit diagram of another photovoltaic system according to an embodiment.

Respective ground PE voltages of three phases of an alternating current grid provided in this embodiment are determined by respective ground impedance Za, Zb, and Zc of the three phases.

The following performs analysis by still using an example in which a relay of a phase C is stuck. When the relay is stuck, equivalent impedance Zex on an inverter side is connected in parallel to an alternating current grid-to-ground PE end. As shown in FIG. 5, Zex and Zc are connected in parallel, to reduce phase C-to-ground PE impedance.

Alternating current grid-to-ground PE impedance is reduced because the relay is stuck, to reduce an alternating current grid voltage. When an alternating current grid-to-ground voltage is less than a short-circuit voltage threshold, it is determined that an alternating current grid-to-ground short circuit fault occurs. When the alternating current grid-to-ground short circuit fault occurs, the photovoltaic system does not determine whether the relay is stuck, and considers by default that the relay is in a normal state. Consequently, that the relay is not stuck is not detected.

It can be understood that, because the relay is stuck but this cannot be detected in a solution of randomly stopping driving of an action of a switch transistor in an inverter in this embodiment, in the solution provided, driving of the action of the switch transistor in the inverter is stopped within a preset phase range of a voltage of a filter capacitor, so that a voltage of the filter capacitor is large. In this way, when that the relay is stuck is detected, a case in which an alternating current grid-to-ground voltage is less than the short-circuit voltage threshold is avoided, to reliably detect that the relay is stuck.

The foregoing content describes a principle of the solutions provided in embodiments. The following describes additional implementation solutions of embodiments with reference to additional embodiments.

To simplify obtaining of a voltage of a filter capacitor, in a possible implementation, a controller provided in an embodiment is configured to stop driving of an action of a switch transistor in an inverter when a phase of the alternating current grid voltage falls within a preset phase range. Because the alternating current grid voltage and the voltage of the filter capacitor have a same frequency and a same phase, that is, the phase of the alternating current grid voltage is the same as the phase of the filter capacitor, the phase of the voltage of the filter capacitor may be determined by detecting the phase of the alternating current grid voltage, and driving of the action of the switch transistor in the inverter may be stopped when the phase of the alternating current grid voltage falls within the preset phase range, without a need to use an additional hardware detection circuit.

In a possible implementation, the controller provided in this embodiment is configured to perform phase locking on the alternating current grid voltage, to obtain the phase of the alternating current grid voltage. Because the phase of the voltage of the filter capacitor and the phase of the alternating current grid voltage have a same frequency and a same phase, driving of the action of the switch transistor in the inverter may be stopped when the phase of the alternating current grid voltage falls within the preset phase range. In the solution provided in this embodiment, phase locking may be performed on the alternating current grid voltage, to obtain the phase of the alternating current grid voltage, so that driving of the action of the switch transistor in the inverter is stopped when the alternating current grid voltage is limited within the preset phase range. In this embodiment, when the alternating current grid voltage is limited within the preset phase range, driving of the action of the switch transistor in the inverter may alternatively be stopped by using another manner or method. This is not limited.

Figure 6:
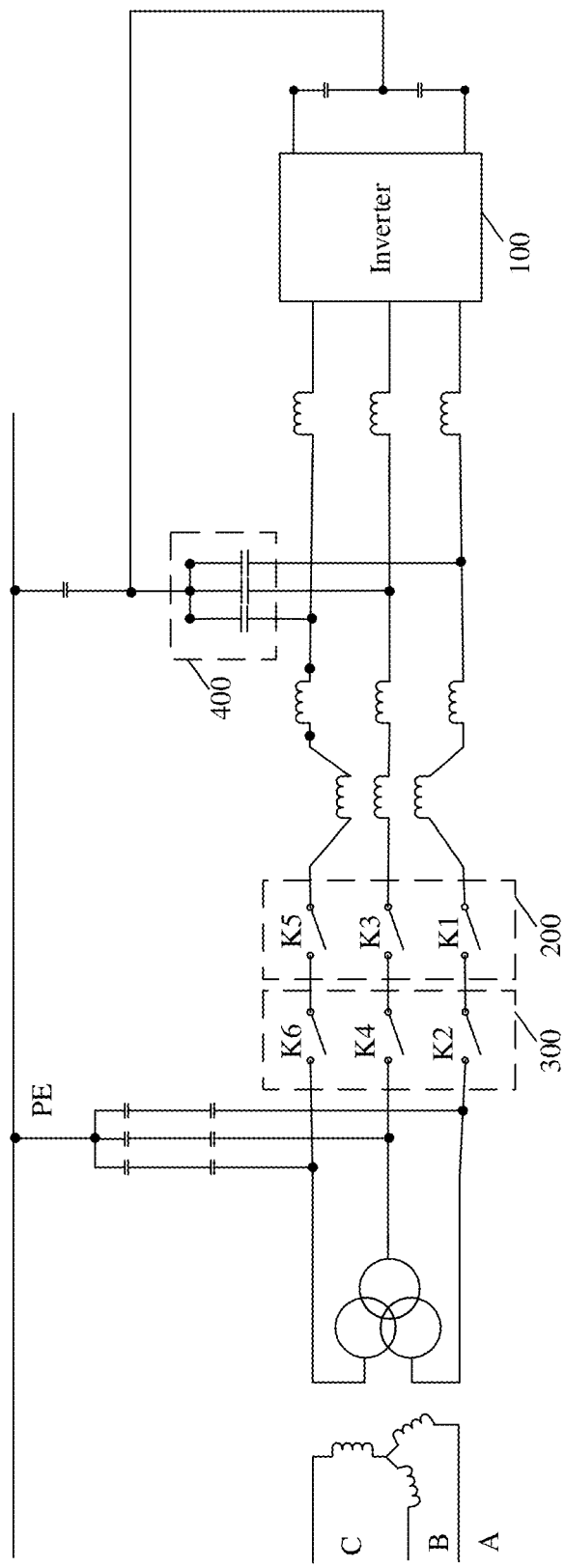
FIG. 6 is a circuit diagram of another photovoltaic system according to an embodiment.

FIG. 6 is a circuit diagram of another photovoltaic system according to an embodiment.

As shown in FIG. 6, a relay provided in this embodiment includes a first-level relay 200 and a second-level relay 300. The first-level relay 200 and the second-level relay 300 are connected in series.

The controller 500 is configured to: send a turn-off instruction to the second-level relay 300 when sending a turn-on instruction to the first-level relay 200, and send fault alarm information of the second-level relay 300 when a valid value of a difference between a voltage of a filter capacitor 400 and an alternating current grid voltage is less than a preset value; and is configured to: send a turn-on instruction to the second-level relay 300 when sending a turn-off instruction to the first-level relay 200, and send fault alarm information of the first-level relay 200 when the valid value of the difference between the voltage of the filter capacitor 400 and the alternating current grid voltage is less than the preset value. It should be understood that when the photovoltaic system provided in this embodiment includes the first-level relay and the second-level relay, two levels of relays need to be turned off separately. For example, the second-level relay is turned on when the first-level relay is turned off.

As shown in FIG. 6, the alternating current grid voltage in this embodiment includes three phases, that is, a phase A, a phase B, and a phase C, and a phase difference between the three phases is 120 degrees. Correspondingly, the relay in this embodiment also includes three switches. The first-level relay 200 includes a first switch K1, a third switch K3, and a fifth switch K5. The second-level relay 300 includes a second switch K2, a fourth switch K4, and a sixth switch K6.

To help control the relay, three switches in the first-level relay or the second-level relay (briefly referred to as a relay below) in this embodiment may share a same signal receive end. To simplify installation, the three switches in the relay in this embodiment may be a whole. When any one of the three switches in the relay is not turned off after receiving a turn-off signal, that is, when any switch is stuck, it is determined that the relay is stuck, and the entire relay is replaced.

In a possible implementation, the controller provided in this embodiment is configured to: perform phase locking on a phase voltage of any phase of the alternating current grid, to obtain a phase of the alternating current grid voltage, and stop driving of an action of a switch transistor in an inverter when the phase of the alternating current grid voltage falls within a preset phase range. It should be understood that, in this embodiment, after phase locking is performed on the phase voltage of the any phase of the alternating current grid, when it is detected that a switch corresponding to the phase is stuck, it may be determined that the relay is stuck, and a relay sticking alarm is sent, so that the entire relay is to be replaced.

To ensure as much as possible that the voltage of the filter capacitor is fixed at a phase of a large voltage value when it is detected that the relay is stuck, to avoid a case in which an alternating current grid-to-ground voltage is less than a short-circuit voltage threshold and avoid a case in which the system determines that a fault is an alternating current grid-to-ground short circuit, in a possible implementation, the controller provided in this embodiment is configured to: perform phase locking on the phase voltage of the any phase of the alternating current grid, to obtain the phase of the alternating current grid voltage; obtain the phase of the voltage of the filter capacitor based on the phase of the alternating current grid voltage; and stop driving of the action of the switch transistor in the inverter when the phase of the voltage of the filter capacitor corresponds to a peak of the voltage of the filter capacitor. It should be understood that, in this embodiment, driving of the action of the switch transistor in the inverter is stopped when the phase of the voltage of the filter capacitor corresponds to the peak of the voltage of the filter capacitor, so that the voltage of the filter capacitor is fixed at a maximum value of the voltage, to avoid as much as possible a case in which the alternating current grid-to-ground voltage is less than the short-circuit voltage threshold, and avoid a case in which the system determines that the fault is an alternating current grid-to-ground short circuit fault.

The solutions provided in the foregoing embodiments may be applied to a photovoltaic system in which a power grid side is not grounded. The following describes a solution in which a photovoltaic system in which a phase V on a power grid side is grounded detects that a relay is stuck. The phase V may be any phase in three phases of the alternating current grid. The following describes, by using an example in which a phase C is grounded, a case in which the solutions provided in embodiments are applied to the photovoltaic system in which the phase V is grounded.

Figure 7:
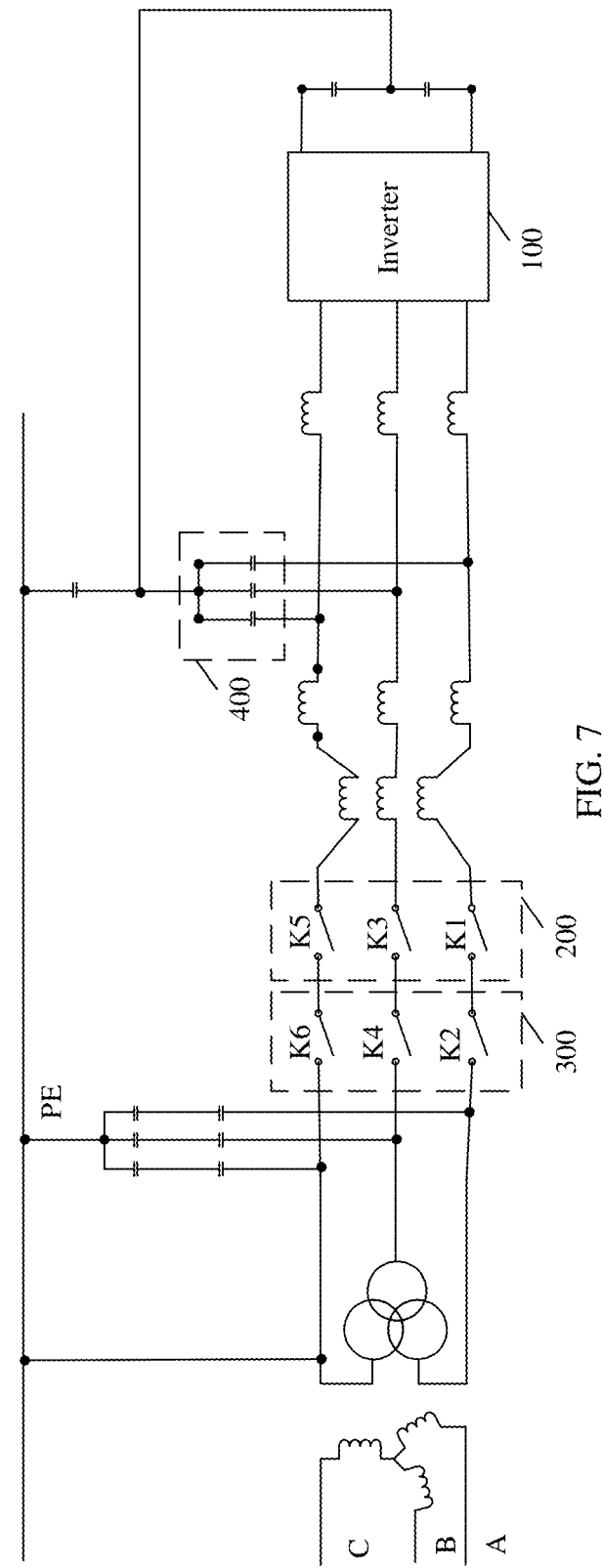
FIG. 7 is a circuit diagram of a photovoltaic system in which a phase V is grounded according to an embodiment.

FIG. 7 is a circuit diagram of a photovoltaic system in which a phase V is grounded according to an embodiment.

As shown in FIG. 7, an alternating current grid voltage in the photovoltaic system provided in this embodiment includes the following three phases: a phase A, a phase B, and a phase C. The phase C is connected to PE. In other words, the phase C is grounded. A sampling manner of the alternating current grid voltage is direct current blocking sampling. That is, a sampled alternating current grid voltage is an alternating current voltage. A voltage of the filter capacitor is obtained through non-direct current blocking sampling.

In this embodiment, to accurately determine whether a relay of the phase V is stuck, when a phase V of the alternating current grid is grounded and it is determined that the relay of the phase V is stuck, fault alarm information of the relay is not sent, that is, no alarm is generated first, but an action of a switch transistor of a phase V in an inverter is driven. Only when a valid value of a difference between a voltage of a filter capacitor and an alternating current grid voltage is still less than a preset value, it is finally determined that the relay is stuck, and the fault alarm information of the relay is sent, to avoid wrongly determining that the relay is stuck when the relay is in a normal state.

When the phase V (the phase C) is grounded, the alternating current grid voltage corresponding to the phase C is 0 because the phase C is grounded. According to the solution provided in this embodiment, before the voltage of the filter capacitor is measured, driving of the action of the switch transistor in the inverter is stopped, and a voltage of the filter capacitor corresponding to the phase C is a stable direct current voltage. In addition, because the voltage of the filter capacitor corresponding to the phase C is obtained through non-direct current blocking sampling, a collected voltage of the filter capacitor is also 0. It can be understood that, the valid value of the difference between the alternating current grid voltage corresponding to the phase C and the voltage of the filter capacitor is zero, that is, less than the preset value 30 V. Therefore, if the solution is used to detect whether the relay is stuck, when the relay is turned off normally, the valid value of the difference between the alternating current grid voltage corresponding to a grounding phase (the phase C) and the voltage of the filter capacitor is also zero, and it is wrongly determined that the relay is stuck.

To resolve the foregoing problem, in a possible implementation, a controller provided in this embodiment is further configured to: when the phase V of the alternating current grid is grounded and it is determined that the relay of the phase V is stuck, continue to emit a pulse to a switch transistor of a phase V in the inverter to drive an action of the switch transistor of a phase V in the inverter, and when a valid value of a difference between a voltage of a filter capacitor and an alternating current grid voltage is less than a preset value, send fault alarm information of the relay of the phase V, for example, information indicating that the relay of the phase V is stuck.

It should be understood that, when an action of a switch transistor of the phase V in the inverter is driven, the inverter outputs an alternating current, and the voltage of the filter capacitor of the phase V is an alternating current voltage. Therefore, when a switch of the relay corresponding to the phase V is turned off normally, the voltage that is of the filter capacitor corresponding to the phase V and that is collected by the photovoltaic system is a valid value of the voltage. Therefore, a voltage difference between two ends of a relay of the phase V is a voltage value of the filter capacitor minus 0. In other words, a difference between an alternating current grid voltage corresponding to the relay of the phase V and the voltage of the filter capacitor is the voltage value of the filter capacitor, and is greater than the preset value, and the relay of the phase V is determined to be in a normal state. According to the solution provided in this embodiment, when the relay of the phase V is turned off normally, the relay of the phase V is determined to be normal. That is, in this solution, wrongly determining that the relay is stuck can be avoided.

In the foregoing implementation, that a relay is stuck when a phase V is grounded is detected. In other words, a pulse is emitted after a PWM driver gating signal stops being sent. In addition, this manner is also applicable to a case in which the phase V is not grounded. In this way, whether the relay is stuck can be detected more reliably. For example, after the PWM driver gating signal stops being sent, no alarm is generated when sticking is detected. Instead, the pulse is still emitted for one or more phases that are stuck, to verify whether sticking really occurs. In other words, a controller provided in this embodiment is further configured to drive an action of a switch transistor of a first phase in an inverter when determining that a relay of the first phase is stuck. When a valid value of a difference between a voltage of a filter capacitor and an alternating current grid voltage is less than a preset value, the relay of the first phase is abnormal. The first phase is any phase in three phases of the alternating current grid. In other words, in the solutions provided in this embodiment, when a relay of any phase is stuck, the foregoing re-determining action may be performed, to avoid wrongly determining that the relay is stuck when the relay is in a normal state. In the photovoltaic system provided in this embodiment, when it is determined that any phase in the relay is stuck (the phase is not limited to the phase V) or after it is determined that the phase is stuck, fault alarm information of the relay may not be sent, that is, no alarm is generated, but an action of a switch transistor of the phase in the inverter is driven. The fault alarm information of the relay is sent only when the valid value of the difference between the voltage of the filter capacitor and the alternating current grid voltage is less than the preset value, to improve accuracy and reliability of detecting a fault of the relay.

Therefore, this embodiment provides a photovoltaic system. The photovoltaic system stops sending a PWM driver gating signal to the inverter only within the preset phase range of the voltage of the filter capacitor, to ensure that the voltage of the filter capacitor has a large value. The voltage of the filter capacitor is output to an alternating current grid side. Because the voltage of the filter capacitor is large, the alternating current grid-to-ground voltage is pulled up, to avoid detecting the fault as an alternating current grid-to-ground short circuit, so that it can be really detected that the relay is stuck. In addition, in this embodiment, when the relay is stuck, an action of the switch transistor in the inverter may be started, to detect the relay again, and avoid wrongly determining that the relay is stuck when the relay is in a normal state.

Based on the photovoltaic system provided in the foregoing embodiments, an embodiment further provides another photovoltaic system. For example, when whether a relay in the photovoltaic system is stuck is determined, a solution may be applied to a case in which a phase V is grounded or may be applied to a case in which a phase V is not grounded. The following provides descriptions by using an example in which the solution is applicable to the case in which the phase V is grounded. A controller may emit a pulse to a switch transistor in an inverter, and then determine whether a valid value of a difference between a voltage of a filter capacitor and an alternating current grid voltage is less than a preset value, to determine whether the relay has a sticking fault. For example, when the voltage of the filter capacitor and the alternating current grid voltage have a same frequency and a same phase, the controller in the photovoltaic system sends a turn-off instruction to the relay; emits a pulse to a switch transistor of any phase in three phases in the inverter, to drive an action of the switch transistor and charge the filter capacitor; and sends fault alarm information of a relay of the any phase when the valid value of the difference between the voltage of the filter capacitor and the alternating current grid voltage is still less than the preset value.

A photovoltaic system provided in an embodiment includes an inverter, a filter capacitor, a relay, and a controller.

An input of the inverter is configured to be connected to a photovoltaic array, an output of the inverter is connected to a first end of the relay, a second end of the relay is connected to an alternating current grid, and the output of the inverter is connected to the filter capacitor.

The controller is configured to: send a turn-off instruction to the relay when a voltage of the filter capacitor and an alternating current grid voltage have a same frequency and a same phase, drive an action of a switch transistor of any phase in three phases in the inverter, determine whether a valid value of a difference between the voltage of the filter capacitor and the alternating current grid voltage is less than a preset value, and send fault alarm information of a relay of any phase if the valid value of the difference between the voltage of the filter capacitor and the alternating current grid voltage is less than the preset value.

The following describes, by using an example in which a phase V represents the any phase, the photovoltaic system provided in this embodiment.

After the controller emits a pulse, the filter capacitor has an alternating current voltage. The alternating current grid voltage is 0 because the phase V is grounded. When the relay is turned off normally, the valid value of the difference between the voltage of the filter capacitor and the alternating current grid voltage is greater than the preset value, and the photovoltaic system determines that the relay is in a normal working state. If the relay is stuck, the filter capacitor is grounded by using the stuck relay and the phase V, and the voltage of the filter capacitor is 0. The alternating current grid voltage is also 0 because the phase V is grounded, and the valid value of the difference between the voltage of the filter capacitor and the alternating current grid voltage is also 0. 0 is less than the preset value, the photovoltaic system determines that the relay is stuck.

The photovoltaic system provided in this embodiment may also be configured to drive an action of a switch transistor of the phase in the inverter when it is determined that any phase (the phase is not limited to the phase V) in the relay is stuck. When the relay is stuck, the filter capacitor is connected to the alternating current grid by using the relay, and the voltage of the filter capacitor is close to the alternating current grid voltage. When the relay is in a normal working state, the voltage of the filter capacitor is close to a voltage output by the inverter, and there is a specific difference between the voltage of the filter capacitor and the alternating current grid voltage. Therefore, when the valid value of the difference between the voltage of the filter capacitor and the alternating current grid voltage is less than the preset value, the photovoltaic system may also determine that the relay is stuck.

Based on the photovoltaic system provided in the foregoing embodiments, an embodiment further provides a relay detection method. The following provides detailed descriptions with reference to the accompanying drawings.

Figure 8:
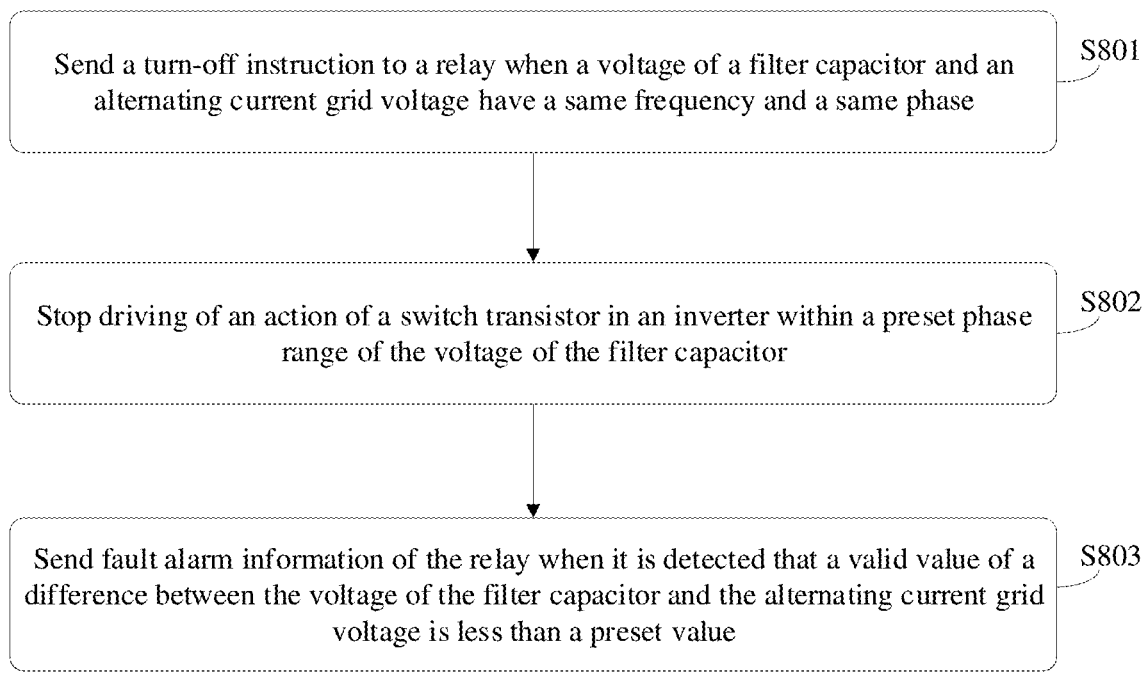
FIG. 8 is a flowchart of a relay detection method according to an embodiment.

FIG. 8 is a flowchart of a relay detection method according to an embodiment.

The relay detection method is applied to a photovoltaic system. The photovoltaic system includes an inverter, a filter capacitor, a relay, and a controller. An input of the inverter is configured to be connected to a photovoltaic array, an output of the inverter is connected to a first end of the relay, a second end of the relay is connected to an alternating current grid, and the output of the inverter is connected to the filter capacitor. As shown in FIG. 8, the relay detection method provided in this embodiment includes the following steps.

S801: Send a turn-off instruction to the relay when a voltage of the filter capacitor and an alternating current grid voltage have a same frequency and a same phase.

S802: Stop driving of an action of a switch transistor in the inverter within a preset phase range of the voltage of the filter capacitor.

S803: Send fault alarm information of the relay when it is detected that a valid value of a difference between the voltage of the filter capacitor and the alternating current grid voltage is less than a preset value.

According to the solution provided in this embodiment, the controller stops sending a PWM driver gating signal to the inverter only within the preset phase range of the voltage of the filter capacitor, to ensure that the voltage of the filter capacitor has a large value. The voltage of the filter capacitor is output to an alternating current grid side. Because the voltage of the filter capacitor is large, the alternating current grid-to-ground voltage is pulled up, to avoid detecting the fault as an alternating current grid-to-ground short circuit, so that it can be really detected that the relay is stuck.

In a possible implementation, the stopping driving of an action of a switch transistor in the inverter within a preset phase range of the voltage of the filter capacitor in this embodiment includes: stopping driving of the action of the switch transistor in the inverter when the phase of the alternating current grid voltage falls within the preset phase range.

In a possible implementation, the stopping driving of the action of the switch transistor in the inverter when the phase of the alternating current grid voltage falls within the preset phase range in this embodiment includes: performing phase locking on the alternating current grid voltage, to obtain the phase of the alternating current grid voltage, and stopping driving of the action of the switch transistor in the inverter when the phase of the alternating current grid voltage falls within the preset phase range.

In a possible implementation, the performing phase locking on the alternating current grid voltage, to obtain the phase of the alternating current grid voltage, and stopping driving of the action of the switch transistor in the inverter when the phase of the alternating current grid voltage falls within the preset phase range in this embodiment includes: performing phase locking on a phase voltage of any phase of the alternating current grid, to obtain the phase of the alternating current grid voltage, and stopping driving of the action of the switch transistor in the inverter when the phase of the alternating current grid voltage falls within the preset phase range.

In a possible implementation the performing phase locking on a phase voltage of any phase of the alternating current grid, to obtain the phase of the alternating current grid voltage, and stopping driving of the action of the switch transistor in the inverter when the phase of the alternating current grid voltage falls within the preset phase range in this embodiment includes: performing phase locking on the phase voltage of the any phase of the alternating current grid, to obtain the phase of the alternating current grid voltage; obtaining the phase of the voltage of the filter capacitor based on the phase of the alternating current grid voltage; and stopping driving of the action of the switch transistor in the inverter when the phase of the voltage of the filter capacitor corresponds to a peak of the voltage of the filter capacitor.

In a possible implementation, the relay in this embodiment includes a first-level relay and a second-level relay. The first-level relay and the second-level relay are connected in series. When the voltage of the filter capacitor and the alternating current grid voltage have a same frequency and a same phase, controlling the relay to be turned off includes: when the voltage of the filter capacitor and the alternating current grid voltage have a same frequency and a same phase, controlling the first-level relay to be turned off. When the valid value of the difference between the voltage of the filter capacitor and the alternating current grid voltage is less than the preset value, determining that the relay is stuck includes: when the valid value of the difference between the voltage of the filter capacitor and the alternating current grid voltage is less than the preset value, determining that the second-level relay is stuck. When the voltage of the filter capacitor and the alternating current grid voltage have a same frequency and a same phase, controlling the relay to be turned off further includes: when the voltage of the filter capacitor and the alternating current grid voltage have a same frequency and a same phase, controlling the first-level relay to be turned off. When the valid value of the difference between the voltage of the filter capacitor and the alternating current grid voltage is less than the preset value, determining that the relay is stuck further includes: when the valid value of the difference between the voltage of the filter capacitor and the alternating current grid voltage is less than the preset value, the second-level relay is stuck.

The solutions provided in embodiments may be applied to a photovoltaic system in which a power grid side is not grounded, or may be applied to a photovoltaic system in which a phase V is grounded. In the photovoltaic system in which the phase V is grounded and that is provided in embodiments, the phase V may be any phase in three phases of the alternating current grid. The following describes a relay detection method in which the solutions provided in embodiments are applied to a photovoltaic system in which any phase is grounded.

Figure 9:
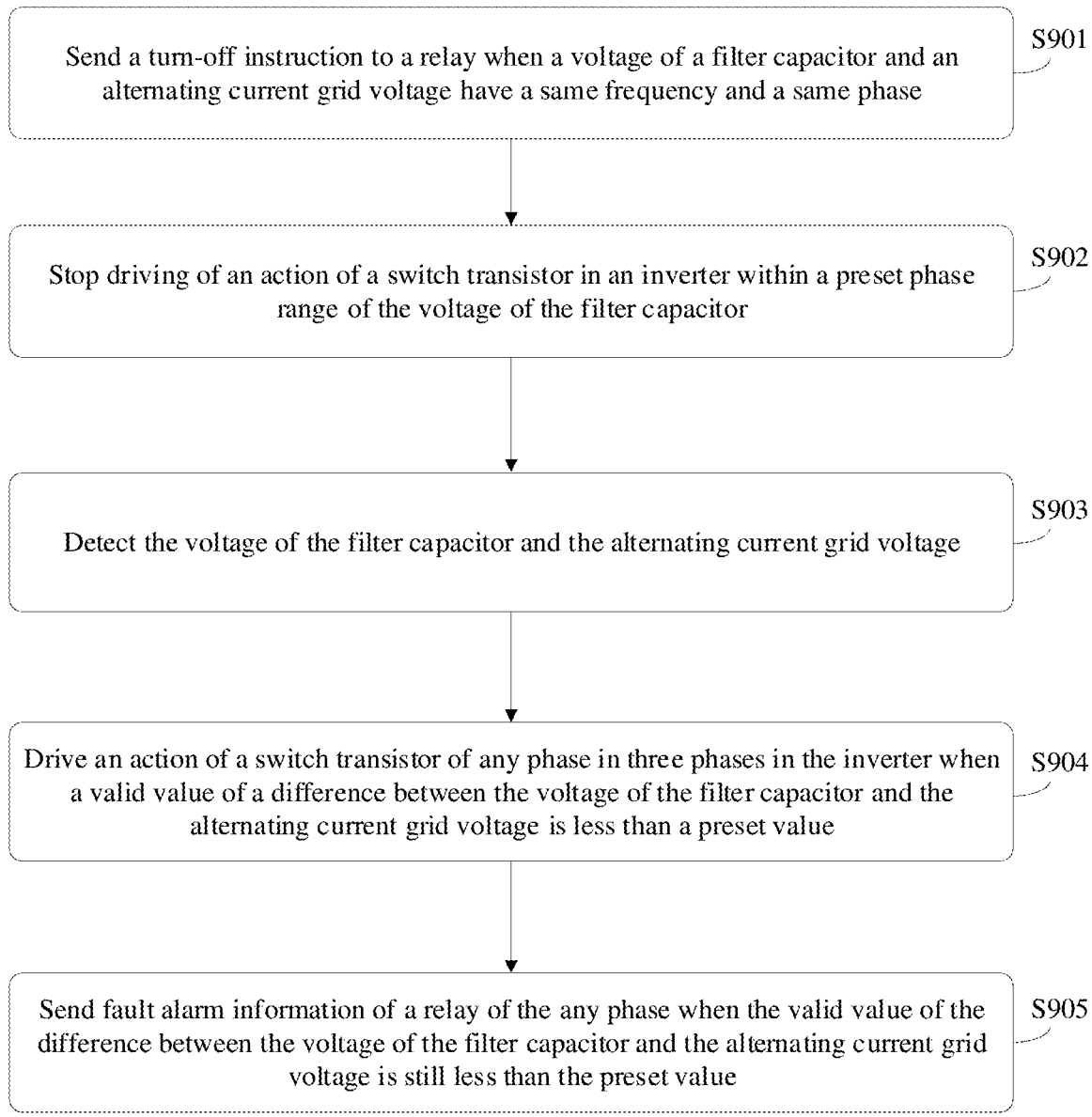
FIG. 9 is a flowchart of another relay detection method according to an embodiment.

FIG. 9 is a flowchart of another relay detection method according to an embodiment.

The relay detection method provided in this embodiment includes the following steps.

S901: Send a turn-off instruction to a relay when a voltage of a filter capacitor and an alternating current grid voltage have a same frequency and a same phase.

S902: Stop driving of an action of a switch transistor in an inverter within a preset phase range of the voltage of the filter capacitor.

S903: Detect the voltage of the filter capacitor and the alternating current grid voltage.

S904: Drive an action of a switch transistor of any phase in three phases in the inverter when a valid value of a difference between the voltage of the filter capacitor and the alternating current grid voltage is less than a preset value.

S905: Send fault alarm information of a relay of the any phase when it is determined that the valid value of the difference between the voltage of the filter capacitor and the alternating current grid voltage is still less than the preset value.

A sampling manner of the alternating current grid voltage is direct current blocking sampling. That is, a sampled alternating current grid voltage is an alternating current voltage. A voltage of the filter capacitor is obtained through non-direct current blocking sampling.

A phase V represents any phase in the three phases below. When an action of a switch transistor of the phase V in the inverter is driven, the inverter outputs an alternating current, and the voltage of the filter capacitor of the phase V is an alternating current voltage. Therefore, when a switch of the relay corresponding to the phase V is turned off normally, the voltage that is of the filter capacitor corresponding to the phase V and that is collected by the photovoltaic system is a valid voltage value. Therefore, a voltage difference between two ends of the relay of the phase V is a valid voltage value minus 0. In other words, a difference between an alternating current grid voltage corresponding to the relay of the phase V and the voltage of the filter capacitor is the valid voltage value, and is greater than the preset value, and the relay of the phase V is determined to be in a normal state. According to the solution provided in this embodiment, when the relay of the phase V is turned off normally, the relay of the phase V is determined to be in a normal state. That is, in this solution, wrongly determining that the relay is stuck can be avoided.

In a possible implementation, the method provided in this embodiment further includes: when it is determined that a relay of a first phase is stuck, driving an action of a switch transistor of a first phase in an inverter. When the valid value of the difference between the voltage of the filter capacitor and the alternating current grid voltage is less than the preset value, the relay of the first phase is abnormal. The first phase is any phase in three phases of the alternating current grid.

Therefore, this embodiment provides a relay detection method. A controller corresponding to the relay may stop driving of the action of the switch transistor in the inverter when a voltage value of the filter capacitor is large, to ensure that the voltage of the filter capacitor is fixed at a phase of a large voltage value when it is detected that the relay is stuck, avoid a case in which an alternating current grid-to-ground voltage is less than a short-circuit voltage threshold, and avoid a case in which the system determines that a fault is an alternating current grid-to-ground short circuit, and the relay is stuck but is not detected. In addition, in this embodiment, when the relay is stuck, the action of the switch transistor in the inverter may be started, to detect the relay again, and avoid wrongly determining that the relay is stuck when the relay is in a normal state.

Based on the photovoltaic system and the relay detection method provided in the foregoing embodiments, an embodiment further provides a power supply system. The following provides detailed descriptions with reference to the accompanying drawings. A solution in which whether a relay is stuck is detected and that is provided in embodiments is not only applicable to a photovoltaic system, but also applicable to another power supply system with an inverter and a relay, provided that an input of the inverter is connected to a direct current power supply.

Figure 10:
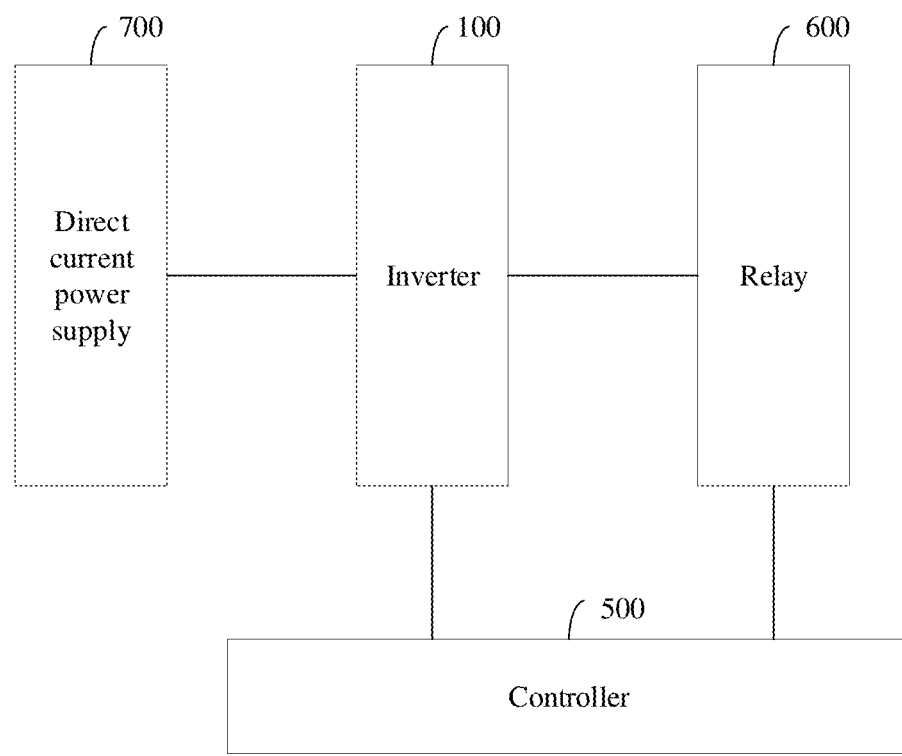
FIG. 10 is a schematic diagram of a power supply system according to an embodiment.

FIG. 10 is a schematic diagram of a power supply system according to an embodiment.

The power supply system provided in this embodiment includes an inverter 100, a filter capacitor 400, a relay 600, and a controller 500.

An input of the inverter 100 is configured to be connected to a direct current power supply 700, an output of the inverter 100 is connected to a first end of the relay 600, a second end of the relay 600 is connected to an alternating current grid, and the output of the inverter 100 is connected to the filter capacitor 400.

The controller 500 is configured to: send a turn-off instruction to the relay 600 when a voltage of the filter capacitor 400 and an alternating current grid voltage have a same frequency and a same phase, stop driving of an action of a switch transistor in the inverter 100 when the phase of the voltage of the filter capacitor 400 falls within a preset phase range, and send fault alarm information of the relay 600 when detecting that a valid value of a difference between the voltage of the filter capacitor 400 and the alternating current grid voltage is less than a preset value. The voltage of the filter capacitor 400 is greater than or equal to a preset threshold when the phase of the voltage of the filter capacitor 400 falls within the preset phase range. A specific type of the direct current power supply is not limited in this embodiment. For example, in addition to the photovoltaic array described in the foregoing embodiments, a source of the direct current power supply may be wind power generation, water power generation, an energy storage power station, and the like.

The controller provided in this embodiment stops sending a PWM driver gating signal to the inverter only within the preset phase range of the voltage of the filter capacitor, to ensure that the voltage of the filter capacitor has a large value. The voltage of the filter capacitor is output to an alternating current grid side. Because the voltage of the filter capacitor is large, the alternating current grid-to-ground voltage is pulled up, to avoid detecting the fault as an alternating current grid-to-ground short circuit, so that it can be really detected that the relay is stuck.

Therefore, the controller in the power supply system provided in this embodiment may stop driving of the action of the switch transistor in the inverter when the voltage value of the filter capacitor is large, to ensure that the voltage of the filter capacitor has a large value when that the relay is stuck is detected, and avoid a case in which the relay is stuck but detection is missed because an alternating current grid-to-ground voltage is less than a short-circuit voltage threshold, and a ground short circuit fault is detected but it is considered by default that the relay is normal. Because the voltage of the filter capacitor is large enough in the solution provided in this embodiment, when the relay is stuck, that the relay is stuck may be detected accurately.

It should be understood that, in the embodiments, "at least one (item)" means one or more, and "a plurality of" means two or more.

Persons of ordinary skill in the art should understand that they may still make modifications to the solutions described in the foregoing embodiments or make equivalent replacements to some technical features thereof, without departing from the spirit and scope of the solutions of the embodiments.

What is claimed is:

1. A photovoltaic system, comprising:
    an inverter and a relay, wherein an input of the inverter is configured to be connected to a photovoltaic array, an output of the inverter is connected to a first end of the relay, and a second end of the relay is configured to be connected to an alternating current grid;
    a filter capacitor, wherein the output of the inverter is connected to the filter capacitor; and
    a controller, wherein the controller is configured to:
        send a turn-off instruction to the relay when a voltage of the filter capacitor and an alternating current grid voltage have a same frequency and a same phase, stop driving of an action of a switch transistor in the inverter when the phase of the voltage of the filter capacitor falls within a preset phase range, and
        send fault alarm information of the relay when detecting that a valid value of a difference between the voltage of the filter capacitor and the alternating current grid voltage is less than a preset value, wherein the voltage of the filter capacitor is greater than or equal to a preset threshold when the phase of the voltage of the filter capacitor falls within the preset phase range.

2. The photovoltaic system according to claim 1, wherein the controller is further configured to obtain the phase of the voltage of the filter capacitor based on the phase of the alternating current grid voltage.

3. The photovoltaic system according to claim 2, wherein the controller is further configured to perform phase locking on a phase voltage of any phase of the alternating current grid, to obtain the phase of the alternating current grid voltage.

4. The photovoltaic system according to claim 1, wherein the controller is further configured to stop driving of the action of the switch transistor in the inverter when the phase of the voltage of the filter capacitor is at a peak of the voltage of the filter capacitor.

5. The photovoltaic system according to claim 1, wherein the relay comprises a first-level relay and a second-level relay;
    the first-level relay and the second-level relay are connected in series between the output of the inverter and the alternating current grid; and
    the controller is further configured to: send a turn-off instruction to the second-level relay when sending a turn-on instruction to the first-level relay, and send fault alarm information of the second-level relay when the valid value of the difference between the voltage of the filter capacitor and the alternating current grid voltage is less than the preset value.

6. The photovoltaic system according to claim 1, wherein the relay comprises a first-level relay and a second-level relay;
the first-level relay and the second-level relay are connected in series between the output of the inverter and the alternating current grid; and
the controller is further configured to: send a turn-on instruction to the second-level relay when sending a turn-off instruction to the first-level relay, and send fault alarm information of the first-level relay when the valid value of the difference between the voltage of the filter capacitor and the alternating current grid voltage is less than the preset value.

7. The photovoltaic system according to claim 1, wherein, when any phase in three phases of the alternating current grid is grounded, the controller is further configured to:
drive an action of a switch transistor of the any phase in the inverter after the valid value of the difference between the voltage of the filter capacitor and the alternating current grid voltage is less than the preset value, and
send fault alarm information of a relay of the any phase when determining that the valid value of the difference between the voltage of the filter capacitor and the alternating current grid voltage is still less than the preset value.

8. The photovoltaic system according to claim 1, wherein the controller is further configured to:
drive an action of a switch transistor of any phase in three phases in the inverter after the valid value of the difference between the voltage of the filter capacitor and the alternating current grid voltage is less than the preset value, and
send fault alarm information of a relay of the any phase when determining that the valid value of the difference between the voltage of the filter capacitor and the alternating current grid voltage is still less than the preset value.

9. A method, wherein the method is applied to a photovoltaic system, the photovoltaic system comprises an inverter, a filter capacitor, and a relay, an input of the inverter is configured to be connected to a photovoltaic array, an output of the inverter is connected to a first end of the relay, a second end of the relay is connected to an alternating current grid, the output of the inverter is connected to the filter capacitor, the method comprising:
sending a turn-off instruction to the relay when a voltage of the filter capacitor and an alternating current grid voltage have a same frequency and a same phase;
stopping driving of an action of a switch transistor in the inverter within a preset phase range of the voltage of the filter capacitor, wherein the voltage of the filter capacitor is greater than or equal to a preset threshold when the phase of the voltage of the filter capacitor falls within the preset phase range; and
sending fault alarm information of the relay when it is detected that a valid value of a difference between the voltage of the filter capacitor and the alternating current grid voltage is less than a preset value.

10. The method according to claim 9, further comprising: obtaining the phase of the voltage of the filter capacitor based on the phase of the alternating current grid voltage.

11. The method according to claim 10, wherein obtaining the phase of the voltage of the filter capacitor based on the phase of the alternating current grid voltage comprises: performing phase locking on a phase voltage of any phase of the alternating current grid, to obtain the phase of the alternating current grid voltage.

12. The method according to claim 9, wherein stopping driving of the action of the switch transistor in the inverter within a preset phase range of the voltage of the filter capacitor comprises:
stopping driving of the action of the switch transistor in the inverter when the phase of the voltage of the filter capacitor corresponds to a peak of the voltage of the filter capacitor.

13. The method according to claim 9, wherein the relay comprises a first-level relay and a second-level relay;
the first-level relay and the second-level relay are connected in series between the output of the inverter and the alternating current grid;
sending the turn-off instruction to the relay comprises:
sending a turn-off instruction to the second-level relay when sending a turn-on instruction to the first-level relay; and
sending fault alarm information of the relay when it is detected that the valid value of the difference between the voltage of the filter capacitor and the alternating current grid voltage is less than the preset value comprises:
sending fault alarm information of the second-level relay when the valid value of the difference between the voltage of the filter capacitor and the alternating current grid voltage is less than the preset value.

14. The method according to claim 9, wherein the relay comprises a first-level relay and a second-level relay;
the first-level relay and the second-level relay are connected in series between the output of the inverter and the alternating current grid;
sending the turn-off instruction to the relay comprises:
sending a turn-on instruction to the second-level relay when sending a turn-off instruction to the first-level relay; and
sending fault alarm information of the relay when it is detected that the valid value of the difference between the voltage of the filter capacitor and the alternating current grid voltage is less than the preset value comprises:
sending fault alarm information of the first-level relay when the valid value of the difference between the voltage of the filter capacitor and the alternating current grid voltage is less than the preset value.

15. The method according to claim 9, wherein, when any phase in three phases of the alternating current grid is grounded, after the valid value of the difference between the voltage of the filter capacitor and the alternating current grid voltage is less than the preset value, the method further comprises:
driving an action of a switch transistor of the any phase in the inverter, and sending fault alarm information of a relay of the any phase when it is determined that the valid value of the difference between the voltage of the filter capacitor and the alternating current grid voltage is still less than the preset value.

16. The method according to claim 9, wherein, after the valid value of the difference between the voltage of the filter capacitor and the alternating current grid voltage is less than the preset value, the method further comprises:
driving an action of a switch transistor of any phase in three phases in the inverter, and sending fault alarm information of a relay of the any phase when the valid value of the difference between the voltage of the filter capacitor and the alternating current grid voltage is still less than the preset value.

17. A photovoltaic system, comprising:
an inverter and a relay, wherein an input of the inverter is configured to be connected to a photovoltaic array, an output of the inverter is connected to a first end of the relay, and a second end of the relay is connected to an alternating current grid;
a filter capacitor, wherein the output of the inverter is connected to the filter capacitor; and
a controller, wherein the controller is configured to:
send a turn-off instruction to the relay when a voltage of the filter capacitor and an alternating current grid voltage have a same frequency and a same phase, drive an action of a switch transistor of any phase in three phases in the inverter, and send fault alarm information of a relay of the any phase when a valid value of a difference between the voltage of the filter capacitor and the alternating current grid voltage is less than a preset value.

18. The photovoltaic system according to claim 17, wherein the controller is further configured to obtain the phase of the voltage of the filter capacitor based on the phase of the alternating current grid voltage.

19. The photovoltaic system according to claim 18, wherein the controller is further configured to perform phase locking on a phase voltage of any phase of the alternating current grid, to obtain the phase of the alternating current grid voltage.

20. The photovoltaic system according to claim 17, wherein the controller is further configured to stop driving of the action of the switch transistor in the inverter when the phase of the voltage of the filter capacitor is at a peak of the voltage of the filter capacitor.

* * * * *